United States Patent

Okayama et al.

[11] Patent Number: 5,280,388
[45] Date of Patent: Jan. 18, 1994

[54] WAVELENGTH SELECTIVE PHASE GRATING OPTICAL LOW-PASS FILTER

[75] Inventors: Hiroaki Okayama, Hirakata; Syusuke Ono, Takatsuki, both of Japan

[73] Assignee: Matsushita Electric Industrial Co., Ltd., Osaka, Japan

[21] Appl. No.: 690,696

[22] Filed: Apr. 24, 1991

[30] Foreign Application Priority Data

Apr. 27, 1990 [JP] Japan ................... 2-113302

[51] Int. Cl.$^5$ ............... G02B 5/18; G02B 27/46
[52] U.S. Cl. ................... 359/569; 359/570; 359/571; 359/574; 359/576; 358/55
[58] Field of Search ............... 350/162.2, 162.22, 166, 350/167, 404; 359/566, 568, 569, 570, 571, 576, 574, 494, 497, 498, 499, 500, 885, 888; 358/43, 47, 55

[56] References Cited

U.S. PATENT DOCUMENTS

| | | | |
|---|---|---|---|
| 3,821,795 | 6/1974 | Okano | 350/162.2 |
| 3,910,683 | 10/1975 | Nishino et al. | 359/576 |
| 4,009,939 | 3/1977 | Okano | 350/166 |
| 4,068,260 | 1/1978 | Ohneda et al. | 350/166 |
| 4,093,346 | 6/1978 | Nishino et al. | 359/885 |
| 4,178,611 | 12/1979 | Okano | 359/569 |
| 4,477,148 | 10/1984 | Tsuji et al. | 350/167 |
| 4,484,797 | 11/1984 | Knop et al. | 350/162.2 |
| 4,634,219 | 1/1987 | Suzuks | 350/162.22 |
| 4,795,236 | 1/1989 | Ise . | |
| 4,878,737 | 11/1989 | Ise | 358/44 |
| 4,885,734 | 12/1989 | Yuzo | 350/162.2 |

FOREIGN PATENT DOCUMENTS

0186166A1 7/1986 European Pat. Off. .
62-61002 3/1987 Japan .

OTHER PUBLICATIONS

"Transmission Diffraction Gratings Composed Of One Material With Anomalous Dispersion In The Visible Region", Gerritsen et al., Applied Optics, vol. 27, No. 13, Jul. 1, 1988, pp. 2781-2785.

"Spatial-Frequency Filter for a Kell-Type Color Camera"; R. L. Townsend, Applied Optics; Nov. 1972, vol. 11, No. 11.

Primary Examiner—Bruce Y. Arnold
Assistant Examiner—R. D. Shafer
Attorney, Agent, or Firm—Wenderoth, Lind & Ponack

[57] ABSTRACT

A phase grating optical low-pass filter having wavelength selectivity consisting of a plurality of layers which are the same in refractive index at a certain wavelength and different from one another in refractive index dispersion, and has a configuration for generating a phase difference at a boundary of the layers.

5 Claims, 3 Drawing Sheets

WAVELENGTH SELECTIVE PHASE GRATING OPTICAL LOW-PASS FILTER

BACKGROUND OF THE INVENTION

1. Field of The Invention

The present invention relates to an optical low-pass filter to give suitable optical low-pass effect with a selected cut-off wavelength in obtaining video images in a discrete manner by using an image pickup tube or an image pickup device with a single tube type color video camera or an electronic still camera which has a color separation filter.

2. Description Of The Prior Art

In general, in the video camera and the like using a solid-state image pickup device or an image pickup tube, output images are obtained by optically spatially sampling the images of the object. In this case, when spatial frequency components higher than the spatial sampling frequency of the image pickup device are contained in the image of the object, the output images contain false images or false signals not possessed by the object. In other words, the high spatial frequency components beyond the spatial sampling frequency of the image pickup device generate aliasing. Accordingly, in the abovementioned video camera and the like, in order to eliminate the high spatial frequency component of the object, it has been conventional practice to arrange an optical low-pass filter in a part of the image pickup system to prevent generation of a false color, a false signal, and the like. An optical low-pass filter utilizing birefringence, such as a quartz plate, is extensively used. More recently, low-pass filters utilizing the diffraction of the phase grating also have been used.

A quartz optical low-pass filter which is an optical low-pass filter utilizing quartz (ref.: Japanese Laid-open Patent Publication No. 63-142304/1988) obtains a low-pass effect by separating luminous fluxes in the directions of propagation dependent on the polarized direction, of light by utilizing the birefringence of the quartz plate. The luminous fluxes incident into the quartz optical low-pass filter are separated into two luminous fluxes of ordinary rays and extraordinary rays, and further, by using a plurality of quartz plates and wavelength plates, a low-pass effect is obtained in two-dimensional directions. Further, by controlling the thickness of the quartz plate, the characteristics of the optical low-pass effect can be varied.

A phase grating optical low-pass filter (ref.: Japanese Laid-open Patent Publication No. 63-311323/1988) obtains a low-pass effect by utilizing the phase grating diffraction effect, which varies the optical low-pass effect by varying the configuration of the portion forming the phase difference.

As described above, in the quartz optical low-pass filter, due to the utilization of the birefringence, a MTF (Modulation Transfer Function) characteristic becomes an approximately constant characteristic without depending on the wavelength, and the phase grating low-pass filter is also constructed generally to eliminate variations of the MTF characteristic which are dependent on the wavelength.

However, in recent years, a proposal has been made to increase the image resolution by varying the optical sampling frequency for different wavelength bands to cope with different space frequencies of different wavelength bands of primary color filters to be used for a single tube type video camera or the like. In other words, with attention paid to the fact that the sampling frequency in the green wavelength band which has the highest weight of the luminance signal which contributes to the resolution is higher than the sampling frequencies in the red and blue wavelength bands, only the cut-off frequency of the sampling frequency in the green wavelength band is set to be higher than the cut-off frequency of the sampling frequency in other wavelength bands, thereby expecting one to obtain a higher resolution. To this end, it has been difficult to obtain the cut-off frequency dependent on the wavelength with the conventional quartz optical low-pass filter or the aforementioned phase grating optical low-pass filter.

SUMMARY OF THE INVENTION

An object of the present invention is to provide an optical low-pass filter which has wavelength selectivity, i.e. which has a different cut-off frequency of its optical spatial frequency for different wavelength bands.

In order to attain the above object, an optical low-pass filter of this invention has such a configuration that two layers which are the same in refractive index at a certain wavelength $\lambda$ and different in refractive index dispersions from each other are laid one on the other, so that a phase difference is generated at a boundary plane between the two layers. By this structure, it is intended to realize an optical low-pass filter in which the cut-off frequencies of spatial sampling frequencies are different for different wavelength bands. Preferably, the thickness of each layer is thin, and the boundary plane generating a phase difference has a periodic shape in a section viewed in a direction parallel to the layers.

For example, in a primary color filter or the like used for a video camera or the like, by giving the optical sampling frequencies different values depending on the wavelength band, a high resolution can be obtained by effectively utilizing the spatial frequency in a wavelength band dependent on the primary color filter.

DESCRIPTION OF THE PREFERRED EMBODIMENTS

Figure 1:
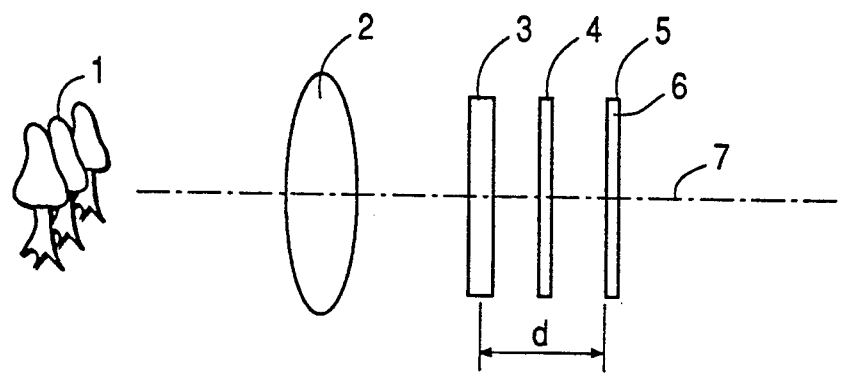
FIG. 1 is a conceptual view of a case where a wavelength selective phase grating optical low-pass filter of this invention is used in an optical system.

FIG. 1 is a conceptual view of a wavelength selective phase grating optical low-pass filter.

In FIG. 1, reference numeral 1 denotes an object; element 2 is a lens system constituted by at least one lens; element 3 is a wavelength selective phase grating optical low-pass filter of this invention; element 4 is a color filter; element 5 is an image plane; element 6 is a solid image pickup device disposed on the image plane; element 7 is an optical axis, and d is a distance from a wavelength selective phase grating optical low-pass filter 3 to the image plane 5. As shown in FIG. 1, an optical low-pass effect which is different depending on wavelength is obtained by disposing the wavelength selective phase grating optical low-pass filter 3 of this invention between the image pickup device 6 and the object 1. However, the position of the optical low-pass filter is not limited to the position shown in FIG. 1, but may be between the object 1 and the lens system 2, or between the lenses in the lens system.

Figure 2:
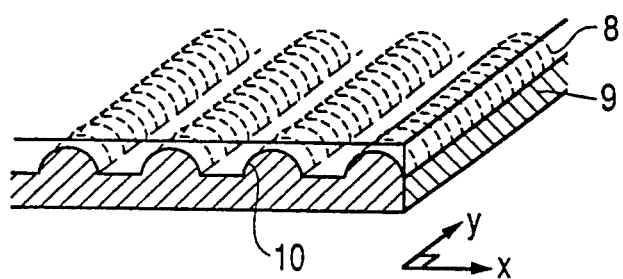
FIG. 2 is a perspective view of an appearance of a wavelength selective phase grating optical low-pass filter constructed by using two different glass materials of the present invention, of which the phase difference forming portion of the boundary plane is formed only in a direction of x.
Figure 3:
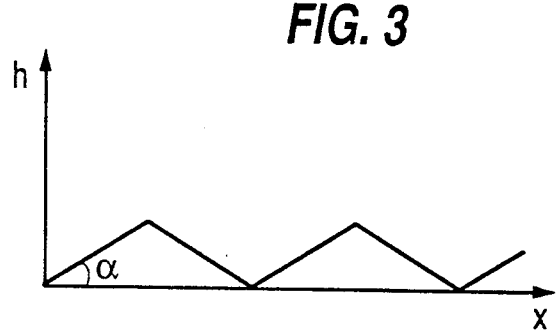
FIG. 3 and FIG. 4 are examples of configurations of the phase difference forming portion.
Figure 4:
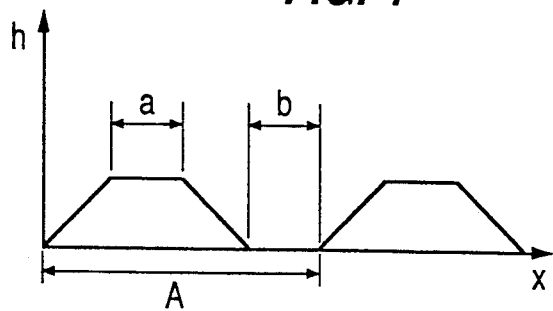

FIG. 2 shows a phase grating optical low-pass filter in which a configuration for generating a stripe form phase difference is formed on the boundary between the two layers. FIG. 3 and FIG. 4 show the configurations of the structure for generating the phase difference in the direction of x in FIG. 2. In FIG. 2, numeral 8 denotes a layer on the object side; element 9 is a layer on the image plane side, and element 10 is a structure for generating a phase difference formed at the boundary of the two layers, and having a sectional configuration to have periodicity in the direction of x in the figure. The layer materials are so selected that, when the refractive index and the refractive index dispersion between the layer 8 and the layer 9 are within the green wavelength band of the primary color filter, i.e., when the wavelength is $\lambda$, the refractive indices of the two layers are equal at 470 nm $< \lambda <$ 580 nm, and the difference of the refractive index dispersions between the layer 8 and the layer 9, i.e., the difference of Abbe's numbers becomes relatively large. That is to say, assuming the refractive index of the layer 8 to be $N_1$ ($\lambda_d$) and Abbe's number to be $\nu d_1$, and the refractive index of the layer 9 to be $N_2$ ($\lambda_d$) and Abbe's number to be $\nu d_2$ in a certain wavelength $\lambda_d$, the following conditions may be satisfied:

$$N_1(\lambda_d) = N_2(\lambda_d)$$

and $$\nu d_1 < \nu d_2 \text{ or } \nu d_1 < \nu d_2.$$

In the green wavelength band, the diffraction effect by the phase grating filter is small because of the small refractive index. On the contrary, in the band of red or blue which is remote from the band of green, a relatively large effect of diffraction is to be sustained because the refractive index difference is larger than in the green band. That is to say, with respect to the green wavelength band which has not largely sustained the effect of diffraction, the low-pass effect is small, and the MTF characteristics are to be extended to the relatively high spatial frequency component. On the other hand, with respect to the wavelength bands of red and blue which have largely sustained the diffraction effects, the low-pass effects are large, and cut-off is to be given with relatively low spatial frequency. The MTF characteristics of the primary color filter are to be obtained as a sum of the MTF values of the respective constituting wavelengths in each wavelength band, i.e.:

$$H = \int H(\lambda) d\lambda$$

where,

H: composite MTF value
H($\lambda$): MTF value at wavelength $\lambda$
$\lambda$: Wavelength Accordingly, as a configuration of the structure 10 for generating the phase difference, the MFT characteristics on each wavelength band for the case where the configurations as shown in FIG. 3 and FIG. 4 are used are shown in FIG. 5 and FIG. 6, respectively.

For example, assume that the refractive index in the line d of the layer 8 is 1.74000, the refractive index dispersion is 28.3 in Abbe's number, the refractive index in the line d of the layer 9 is 1.74320, the refractive index dispersion is 49.3 in Abbe's number.

Figure 5:
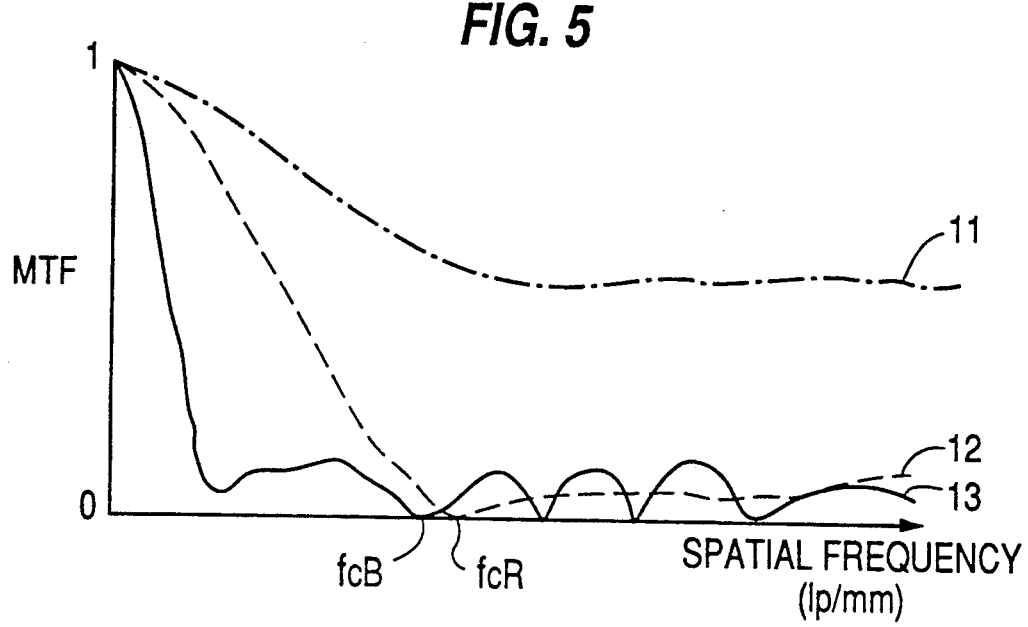
FIG. 5 is an MTF characteristic diagram showing the case where the configuration of FIG. 3 is used.
Figure 6:
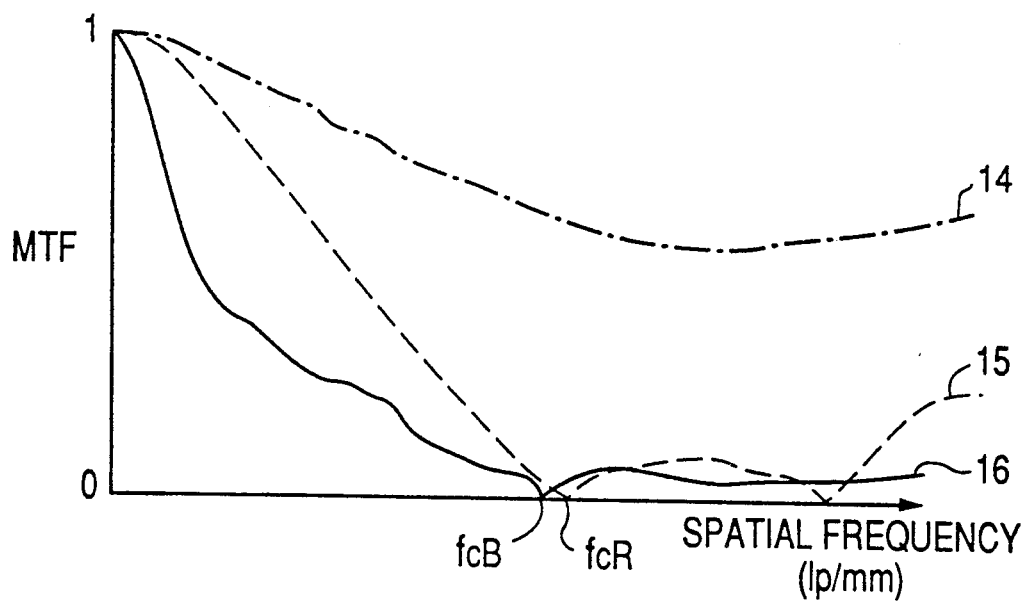
FIG. 6 is an MTF characteristic diagram showing the case where the configuration of FIG. 4 is used.

When the sectional shape of the phase difference forming portion 10 in the direction of x is assumed to be a periodic triangular wave as shown in FIG. 3 and an angle of a side of the triangular wave to a plane perpendicular to the optical axis to be $\alpha$, the MTF characteristic diagram of $\alpha = 18°$ is as given in FIG. 5. In FIG. 5, an alternate dot and dash line 11 is the MTF characteristics of the green band, and the dash line 12 is the MTF characteristics of the red band and a solid line 13 is the MTF characteristics of the blue band. Also, f cB is a cut-off frequency in the blue wavelength band, and f cR is a cut-off frequency in the red wavelength band. It is also assumed that the cut-off frequency in the green wavelength band depends on the cut-off frequency of the optical system, and it extends to a sufficiently high spatial frequency region in this construction.

When the sectional shape of the phase difference forming portion 10 in the direction of x is assumed to be a periodic trapezoidal wave as shown in FIG. 4 and the width of the top flat portion to be a, the width of the bottom flat portion to be b, the period to be $\Lambda$, and the distance from the phase grating optical low-pass filter to the image plane in FIG. 1 to be d, the sectional shape may satisfy the following relationships:

$$a/\Lambda = 0.25$$

$$b/\Lambda = 0.25$$

$$d/\Lambda = 12.8$$

In FIG. 6, an alternate dot and dash line 14 is the MTF characteristics of the green wavelength band of the primary color filter, a dash line 15 is the MTF characteristics of the red wavelength band, and a solid line 16 is the MTF characteristics of the blue wavelength band. Also, f cB is a cut-off frequency in the blue wavelength band, and f cR is a cut-off frequency in the red wavelength band. It is also assumed that the cut-off frequency in the green wavelength band depends on the cut-off frequency of the lens system, and it extends to a sufficiently high spatial frequency region in this construction.

In both FIG. 5 and FIG. 6, in the green wavelength band of the primary color filter, the cut-off frequency is sufficiently high, and the cut-off frequency in the red wavelength band and the cut-off frequency in the blue wavelength band are approximately equal.

Figure 7:
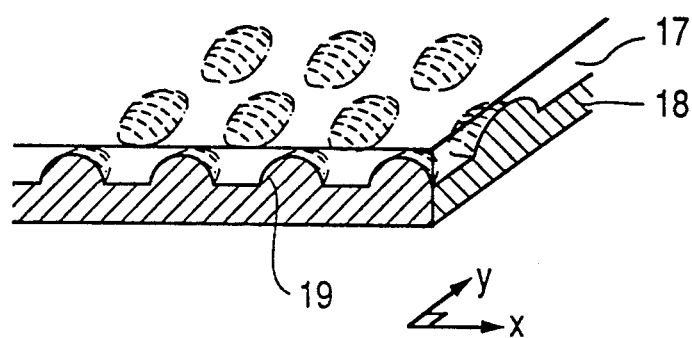
FIG. 7 is a perspective view of an appearance of a wavelength selective phase grating optical low-pass filter constructed by using two different glass materials of the present invention, of which the phase difference forming portion of the boundary plane is formed in two-dimensional directions of x and y.

FIG. 7 shows a phase grating optical low-pass filter in which there is formed a structure for generating phase differences in stripe form in two-dimensional directions at the boundary of the two layers. In FIG. 7, element 17 is a layer on the object side in the case where the filter of the invention is disposed as in FIG. 1, 18 shows a layer on the image plane side, element 19 is a boundary of the two layers having a structure for generating phase differences two-dimensionally in x and y directions.

Figure 8:
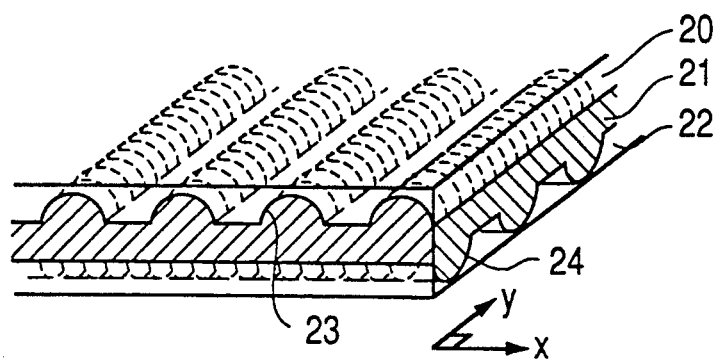
FIG. 8 is a perspective view of an appearance of a wavelength selective phase grating optical low-pass filter constructed by using three sheets of two different glass materials of the present invention, of which the respective phase difference forming portions of the boundary planes are formed in different directions, i.e., x direction and y direction.

FIG. 8 shows a phase grating optical low-pass filter in which there is formed a structure for generating phase differences in stripe form so as to intersect perpendicularly to one another on the respective boundaries of the phase grating filter constituted in three layers. In FIG. 8, element 20 is a layer on the object side in the case where the filter is disposed as in FIG. 1; element 21 is a second layer from the object side, and element 22 is the layer on the image plane side. The parts 23 and 24 are the boundaries having structures to generate the phase differences formed on the boundary planes of the respective layers, The structure 23 for generating the phase difference is formed in a sectional shape of stripes having periodicity in the direction x, and the structure 24 for generating the phase difference is formed in a sectional shape of stripes having periodicity in the direction y.

In FIG. 7, when the sectional shape in x direction or y direction is formed into a configuration as shown in FIG. 3 or FIG. 4, the characteristics as shown in FIG. 5 or FIG. 6 can be obtained. Furthermore, in FIG. 8, when the configuration 23 in the direction x of the boundary between layers 20 and 21 and the configuration 24 in the direction y of the boundary between layers 21 and 22 are formed into the configurations as shown in FIG. 3 or FIG. 4, the characteristics as shown in FIG. 5 or FIG. 6 can be obtained.

What is claimed is:

1. A wavelength selective phase grating optical low-pass filter having a spatial sampling cut-off frequency which varies depending on a wavelength of light, comprises at least two layers which are laminated on one another so as to form therebetween a boundary plane which has a periodic shape in a section viewed in a direction parallel to said layers to generate a phase difference of light passing therethrough, said at least two layers having the same refractive index at a certain wavelength and having different refractive index dispersions from one another; wherein said at least two layers comprise first and second layers laminated on each other so as to form said boundary plane therebetween, and wherein said filter satisfies the following conditions:

$$N_1(\lambda_d) = N_2(\lambda_d); \text{ and}$$

$$\nu d_1 < \nu d_2 \text{ or } \nu d_1 < \nu d_2,$$

where $\lambda_d$ is said certain wavelength in a range longer than 470 nm and shorter than 580 nm, $N_1(\lambda_d)$ and $N_2(\lambda_d)$ are refractive indexes of said first and second layers, respectively, and $\nu d_1$ and $\nu d_2$ are Abbe's numbers of said first and second layers, respectively.

2. A wavelength selective phase grating optical low-pass filter according to claim 1, wherein said periodic shape is a shape of periodically arranged triangular waves.

3. A wavelength selective phase grating optical low-pass filter according to claim 1, wherein said periodic shape is a shape of periodically arranged trapezoidal waves.

4. A wavelength selective phase grating optical low-pass filter according to claim 1, wherein said boundary plane has a first periodic shape in a first section viewed in a direction parallel to said layers, and a second periodic shape in a second section which is viewed in a direction parallel to said layers and perpendicular to said first section to two-dimensionally generate phase differences of light.

5. A wavelength selective phase grating optical low-pass filter according to claim 1, wherein said at least two layers comprises a first layer, a second layer laminated on said first layer so as to form a first boundary plane therebetween, and a third layer laminated on said second layer so as to form a second boundary therebetween, each of said first and second boundary planes having a periodic shape in a section viewed in a direction parallel to said layers, the periodic shapes of said first and second boundary planes crossing in a perpendicular direction to each other to two-dimensionally generate phase differences of light.

* * * * *